United States Patent
Kawahara

(10) Patent No.: US 10,036,459 B2
(45) Date of Patent: Jul. 31, 2018

(54) LOCK-UP DEVICE FOR TORQUE CONVERTER

(71) Applicant: EXEDY Corporation, Neyagawa-shi, Osaka (JP)

(72) Inventor: Yuki Kawahara, Neyagawa (JP)

(73) Assignee: EXEDY CORPORATION, Neyagawa-shi, Osaka (JP)

( * ) Notice: Subject to any disclaimer, the term of this patent is extended or adjusted under 35 U.S.C. 154(b) by 103 days.

(21) Appl. No.: 14/888,349

(22) PCT Filed: Mar. 20, 2014

(86) PCT No.: PCT/JP2014/057721
§ 371 (c)(1),
(2) Date: Oct. 30, 2015

(87) PCT Pub. No.: WO2014/185147
PCT Pub. Date: Nov. 20, 2014

(65) Prior Publication Data
US 2016/0061306 A1    Mar. 3, 2016

(30) Foreign Application Priority Data

May 16, 2013  (JP) ................................. 2013-103681

(51) Int. Cl.
*F16F 15/123*    (2006.01)
*F16H 45/02*    (2006.01)

(52) U.S. Cl.
CPC ....... *F16H 45/02* (2013.01); *F16F 15/12366* (2013.01); *F16F 15/12373* (2013.01);
(Continued)

(58) Field of Classification Search
CPC .......... F16F 15/12366; F16F 15/12373; F16H 45/02; F16H 2045/02025; F16H 2045/0226; F16H 2045/0278; F16H 2045/0231
See application file for complete search history.

(56) References Cited

U.S. PATENT DOCUMENTS 6,217,451 B1     4/2001   Kooy et al.
6,938,744 B2 *   9/2005   Tomiyama .............. F16H 45/02
                                                        192/212
(Continued)

FOREIGN PATENT DOCUMENTS

CN       1109828 A       10/1995
CN       101874169 A     10/2010
(Continued)

OTHER PUBLICATIONS

Machine Translation of JP 2011-252584 A; Nov. 15, 2011, Exedy Corp.*
(Continued)

*Primary Examiner* — Logan Kraft
(74) *Attorney, Agent, or Firm* — United IP Counselors, LLC

(57) ABSTRACT

A lock-up device for a torque converter includes an output rotary member rotatable with respect to an input rotary member. A plurality of large coil springs are disposed in radially outer positions so as to be aligned in a circumferential direction, the large coil springs separately compressed in a rotational direction by relative rotation between the input rotary member and the output rotary member. A plurality of small coil springs are set to have a free length shorter than a free length of the large coil springs, the small coil springs separately disposed in inner peripheral parts of the large coil springs so as to be movable therein. The respective coil springs are compressed in a sequential order
(Continued)

of the plural large coil springs and then at least any one of the plural small coil springs by the relative rotation between the input rotary member and the output rotary member.

9 Claims, 7 Drawing Sheets

(52) U.S. Cl.
CPC ............... *F16H 2045/0205* (2013.01); *F16H 2045/0226* (2013.01); *F16H 2045/0231* (2013.01); *F16H 2045/0278* (2013.01)

(56) References Cited

U.S. PATENT DOCUMENTS

| | | | |
|---|---|---|---|
| 2009/0247307 A1 | 10/2009 | Ishikawa et al. | |
| 2011/0011691 A1* | 1/2011 | Tomiyama | F16H 45/02 192/3.29 |
| 2012/0292150 A1 | 11/2012 | Tomiyama | |

FOREIGN PATENT DOCUMENTS

| | | |
|---|---|---|
| CN | 102782366 A | 11/2012 |
| JP | 2009243599 A | 10/2009 |
| JP | 2010031951 A | 2/2010 |
| JP | 2011179515 A | 9/2011 |
| JP | 2011252584 A | 12/2011 |
| JP | 2012219999 A | 11/2012 |
| KR | 20120117899 A | 10/2012 |
| WO | WO2009122840 A1 | 10/2009 |
| WO | WO2011105182 A1 | 9/2011 |
| WO | WO2012140938 A1 | 10/2012 |

OTHER PUBLICATIONS

International Search Report for Int'l App. No. PCT/JP2014/057721, dated Jun. 10, 2014, 1-2.

Office Action dated Apr. 1, 2017 for Chinese Application No. 201480025628.5, 8 pages.

* cited by examiner

LOCK-UP DEVICE FOR TORQUE CONVERTER

CROSS-REFERENCES TO RELATED APPLICATIONS

This application is the U.S. National Phase of PCT International Application No. PCT/JP2014/057721, filed on Mar. 20, 2014. That application claims priority to Japanese Patent Application No. 2013-103681, filed May 16, 2013. The contents of both applications are herein incorporated by reference in their entirety.

BACKGROUND

Technical Field

The present invention relates to a lock-up device for a torque converter, particularly to a lock-up device for a torque converter for transmitting a torque and absorbing and attenuating a torsional vibration.

Background Art

Torque converters are often equipped with a lock-up device for directly transmitting a torque from a front cover to a turbine. This type of lock-up device includes a piston, a drive plate, a plurality of coil springs, a driven plate and a spring holder (see Japan Laid-open Patent Application Publication No. 2011-252584).

In this type of lock-up device, a plurality of large coil springs are disposed on the outer peripheral side, and likewise, a plurality of large coil springs are disposed on the inner peripheral side. Additionally, small coil springs are respectively disposed in the inner peripheral parts of the plural large coil springs disposed on the inner peripheral side, and each has a free length shorter than that of each large coil spring disposed on the inner peripheral side. With the construction, multistage torsional characteristics are formed.

SUMMARY

In the well-known lock-up device, the plural large coil springs are disposed on the outer peripheral side, whereas the other plural large coil springs and the plural small coil springs are disposed on the inner peripheral side. With the construction, three-stage torsional characteristics are formed.

Now in the torque converter, in general, a region ranging from the radial middle to the inner peripheral side has an axial thickness larger than that of the outer peripheral side. With the construction, there is a possibility that when the well-known lock-up device is installed in the torque converter, the entire device construction composed of the torque converter and the lock-up device is inevitably increased in axial thickness. Specifically as described above, in the well-known lock-up device, the small coil springs are respectively disposed in the inner peripheral parts of the large coil springs disposed on the inner peripheral side. Hence, the large coil springs disposed on the inner peripheral side are increased in diameter. Due to this, the lock-up device is inevitably increased in axial thickness on the inner peripheral side. Additionally, there is a possibility that when the large coil springs disposed on the inner peripheral side are increased in diameter, the entirety of the lock-up device is also inevitably increased in radial size.

The present invention has been produced in view of the drawback as described above, and it is an object of the present invention to set multistage torsional characteristics for a lock-up device, and simultaneously, to achieve compactness in size of an entire device construction composed of a torque converter and the lock-up device installed therein.

Solution to Problems

A lock-up device for a torque converter according to a first aspect is a device for transmitting a torque and for absorbing and attenuating a torsional vibration. The present lock-up device includes an input rotary member, an output rotary member, a plurality of large coil springs and a plurality of small coil springs. The output rotary member is disposed so as to be rotatable with respect to the input rotary member. The plural large coil springs are disposed in radially outer positions so as to be aligned in a circumferential direction. The large coil springs are configured to be separately compressed in a rotational direction by relative rotation between the input rotary member and the output rotary member. The plural small coil springs are respectively set to have a free length shorter than a free length of the large coil springs. The small coil springs are disposed in inner peripheral parts of the large coil springs so as to be movable therein. In the lock-up device thus constructed, the respective coil springs are configured to be compressed in a sequential order of the plural large coil springs and then at least any one of the plural small coil springs by the relative rotation between the input rotary member and the output rotary member.

In the present lock-up device, when the input rotary member and the output rotary member are rotated relatively to each other, and then, for instance, a torsion angle is produced between the input rotary member and the output rotary member, the plural large coil springs are configured to be compressed. With the configuration, a first stage torsional stiffness is formed in torsional characteristics. Next, when a torsion angle becomes a predetermined first angle or greater, the plural large coil springs and any one of the plural small coil springs are configured to be compressed. Accordingly, a second stage torsional stiffness is formed in the torsional characteristics. Subsequently, when the torsion angle becomes a predetermined second angle or greater, the plural large coil springs and (all of) the plural small coil springs are configured to be compressed. Accordingly, a third stage torsional stiffness is formed in the torsional characteristics. Thus, multistage torsional characteristics can be set in the present lock-up device.

Additionally, in the present lock-up device, the plural large coil springs are disposed in the radially outer positions so as to be aligned in the circumferential direction, and the plural small coil springs are respectively disposed in the inner peripheral parts of the large coil springs so as to be movable therein. Put differently, in the present lock-up device, the plural large coil springs and the plural small coil springs are disposed on the outer peripheral part having axially small thickness in the torque converter. Hence, even when the lock-up device is installed in the torque converter, the entire device construction can be produced with a smaller size than that of a conventional art.

A lock-up device for a torque converter according to a second aspect relates to the lock-up device as in the first aspect, and wherein the free lengths of any two of the large coil springs disposed radially in opposition to each other are equal. Furthermore, the free lengths of any two of the small coil springs disposed radially in opposition to each other are equal.

In the present lock-up device, the constructions of any coil springs radially opposed to each other (the constructions of the large coil springs and the constructions of the small coil springs) are the same. Hence, imbalance in center of gravity can be prevented in the lock-up device. Accordingly, a torque can be stably transmitted to a main driveshaft of a transmission.

A lock-up device for a torque converter according to a third aspect relates to the lock-up device as in the first aspect, and wherein the free lengths of any two of the small coil springs disposed adjacently to each other in the rotational direction are different.

In the present lock-up device, multistage torsional characteristics can be set by setting any two of the small coil springs disposed circumferentially adjacent to each other to have different free lengths. Specifically, in this case, multistage torsional characteristics can be set by sequentially compressing the small coil springs in accordance with increase in torsion angle such that the small coil spring of the type having a long free length is compressed first. Thus, in the present lock-up device, multistage torsional characteristics can be set without addition of coil springs. Put differently, the lock-up device can be set to have multistage torsional characteristics, and under the condition, compactness in size of the entire device construction can be achieved.

A lock-up device for a torque converter according to a fourth aspect relates to the lock-up device as in the third aspect, and wherein the plural small coil springs include a first small coil spring and a second small coil spring. The first small coil spring and the second small coil spring are disposed in the inner peripheral parts of the large coil springs so as to be aligned adjacently to each other in the circumferential direction. The free length of the first small coil spring and the free length of the second small coil spring are different.

In the present lock-up device, when the torsion angle becomes the predetermined first angle or greater, the plural large coil springs and a type of the small coil springs having a long free length (either the first small coil spring or the second small coil spring) are configured to be compressed. Accordingly, the second stage torsional stiffness is formed in the torsional characteristics. Next, when the torsion angle becomes the predetermined second angle or greater, the plural large coil springs and (all of) the plural small coil springs (both the first small coil spring and the second small coil spring) are configured to be compressed. Accordingly, the third stage torsional stiffness is formed in the torsional characteristics.

Thus, in the present lock-up device, multistage torsional characteristics can be set without addition of a space required for coil springs. Put differently, the lock-up device can be set to have multistage torsional characteristics, and under the condition, compactness in size of the entire device construction can be achieved.

A lock-up device for a torque converter according to a fifth aspect relates to the lock-up device as in the fourth aspect, and wherein the plural small coil springs further include a third small coil spring. The first to third small coil springs are separately disposed in the inner peripheral parts of the large coil springs so as to be aligned in the circumferential direction in a sequential order of the first small coil spring, the second small coil spring and the third small coil spring. The free length of the first small coil spring is longer than the free length of either of the second and third small coil springs. The free length of the either of the second and third small coil springs is longer than the free length of the other of the second and third small coil springs.

In the present lock-up device, when the torsion angle becomes the predetermined first angle or greater, the plural large coil springs and the small coil spring of the type having the longest free length (the first small coil spring) are configured to be compressed. Accordingly, the second stage torsional stiffness is formed in the torsional characteristics. Next, when the torsion angle becomes the predetermined second angle or greater, the plural large coil springs, the first small coil spring, and the small coil spring of the type having the second longest free length (either the second small coil spring or the third small coil spring) are configured to be compressed. Accordingly, the third stage torsional stiffness is formed in the torsional characteristics. Subsequently, when the torsion angle becomes the predetermined third angle or greater, the plural large coil springs and (all of) the plural small coil springs (the first to third small coil springs) are configured to be compressed. Accordingly, the fourth stage torsional stiffness is formed in the torsional characteristics.

As described above, in the present lock-up device, multistage torsional characteristics can be set without addition of a space required for coil springs. Put differently, the lock-up device can be set to have multistage torsional characteristics, and under the condition, compactness in size of the entire device construction can be achieved.

A lock-up device for a torque converter according to a sixth aspect relates to the lock-up device as in the first aspect, and wherein a stiffness ratio of an (N+1)-th torsional stiffness to an N-th torsional stiffness is set to be greater than or equal to 1.5 and less than or equal to 4.0 (N is a natural number) in at least one bent point of multistage torsional characteristics representing a relation between a torsion angle and the torque. The multistage torsional characteristics are characteristics formed by compressing at least either the large coil springs or the small coil springs in accordance with the torsion angle corresponding to the relative rotation between the input rotary member and the output rotary member.

In the present lock-up device, the stiffness ratio of the (N+1)-th torsional stiffness to the N-th torsional stiffness is set to be greater than or equal to 1.5 and less than or equal to 4.0 in at least one bent point of the multistage torsional characteristics. Hence, it is possible to inhibit a vibration that could be generated when a point on the curve of torsional characteristics exceeds any bent point, i.e., a vibration due to difference in magnitude of stiffness between stages. Thus, in the present lock-up device, it is possible to reliably inhibit a vibration attributed to coil springs.

A lock-up device for a torque converter according to a seventh aspect relates to the lock-up device as in the first aspect, and further includes a plurality of parallel coil springs. The plural parallel coil springs are disposed radially inward of the large coil springs so as to be aligned in the circumferential direction, and are configured to be separately actuated in parallel to the large coil springs. The respective coil springs are configured to be compressed in a sequential order of the plural large coil springs, at least any one of the plural small coil springs and at least one of the plural parallel coil springs by the relative rotation between the input rotary member and the output rotary member.

The present lock-up device further includes the plural parallel coil springs disposed on the inner peripheral side of the large coil springs. Hence, the number of stages of torsional characteristics can be further increased. By thus increasing the number of stages of torsional characteristics, the curve of torsional characteristics can be smoothly formed until the torque reaches the maximum value.

A lock-up device for a torque converter according to an eighth aspect relates to the lock-up device as in the seventh aspect, and wherein a space is produced circumferentially between each of the parallel coil springs and one of the input rotary member and the output rotary member. The at least one of the plural parallel coil springs is configured to be compressed when a torsion angle corresponding to the relative rotation between the input rotary member and the output rotary member becomes a predetermined angle.

In the present lock-up device, the space is produced between each parallel coil spring and the output rotary member. With the construction, the timing of actuating the parallel coil springs is determined. Therefore, the timing of actuating the parallel coil springs can be easily set by changing the size of each space. Put differently, desired torsional characteristics can be easily set.

A lock-up device for a torque converter according to a ninth aspect relates to the lock-up device as in the seventh aspect, and wherein a stiffness ratio of an (N+1)-th torsional stiffness to an N-th torsional stiffness is set to be greater than or equal to 1.5 and less than or equal to 4.0 (N is a natural number) in at least one bent point of multistage torsional characteristics representing a relation between a torsion angle and the torque. The multistage torsional characteristics are characteristics formed by compressing at least any one type of the coil springs including the large coil springs, the small coil springs, and the parallel coil springs in accordance with the torsion angle corresponding to the relative rotation between the input rotary member and the output rotary member.

In the present lock-up device, the stiffness ratio of the (N+1)-th torsional stiffness to the N-th torsional stiffness is set to be greater than or equal to 1.5 and less than or equal to 4.0 in at least one bent point of the multistage torsional characteristics. Hence, it is possible to inhibit a vibration that could be generated when a point on the curve of torsional characteristics exceeds any bent point, i.e., a vibration due to difference in magnitude of stiffness between stages. Thus, in the present lock-up device, it is possible to reliably inhibit a vibration attributed to coil springs even when the number of stages of torsional characteristics is increased.

In the present invention, it is possible to set multistage torsional characteristics for a lock-up device, and simultaneously, to achieve compactness in size of the entire device construction composed of a torque converter and the lock-up device installed therein.

DETAILED DESCRIPTION OF EMBODIMENTS

First Exemplary Embodiment

[Construction of Torque Converter]

Figure 1:
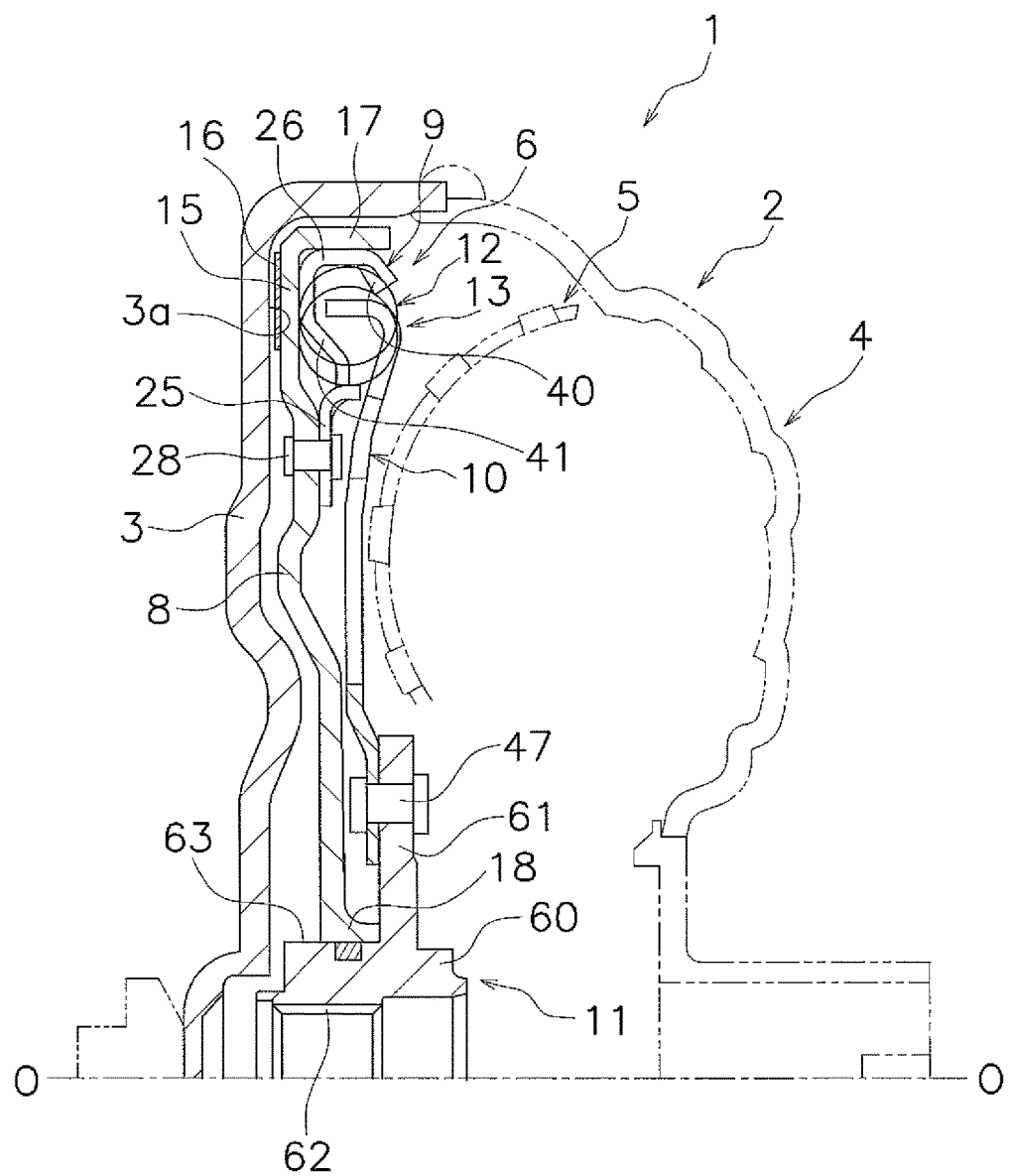
FIG. 1 is a schematic vertical cross-sectional view of a torque converter employing a first exemplary embodiment of the present invention.
Figure 2:
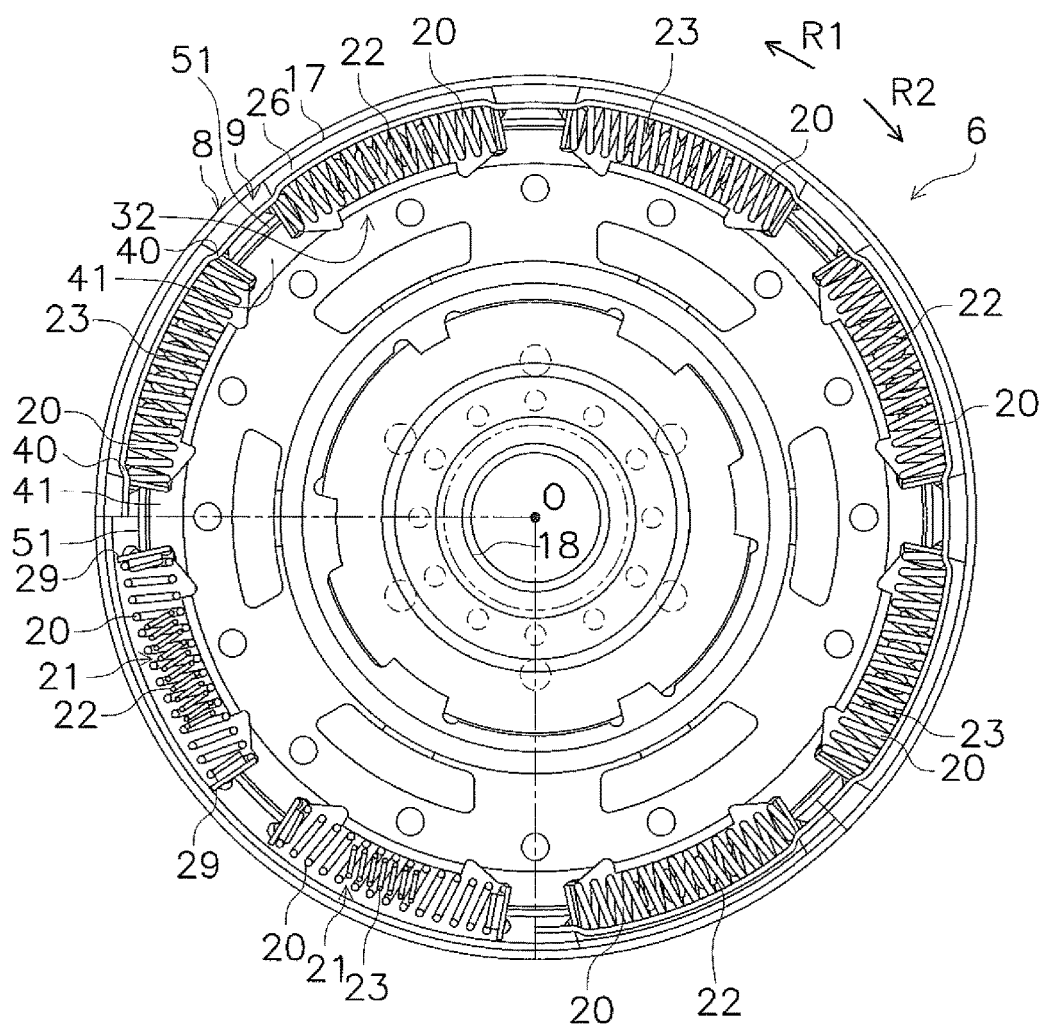
FIG. 2 is a lateral face view of a lock-up device.

FIG. 1 shows a schematic vertical cross-sectional view of a torque converter 1 as an exemplary embodiment of the present invention. In FIG. 1, an engine (not shown in the drawing) is disposed on the left side, whereas a transmission (not shown in the drawing) is disposed on the right side. In FIG. 2, an R1 direction indicates a forward rotational direction. Additionally, O-O depicted in FIG. 1 indicates a rotational axis of the torque converter 1, arrow R1 depicted in FIG. 2 indicates an engine rotational direction, and arrow R2 indicates a rotational direction opposite to the engine rotational direction.

The torque converter 1 includes a torque converter body 2 and a lock-up device 6. In FIG. 1, the torque converter body 2 is mainly composed of a front cover 3, an impeller 4, a turbine 5 and so forth. The construction of the torque converter body 2 is similar to that of a well-known torque converter body, and therefore will be briefly explained.

The front cover 3 is a disc-shaped member coupled to a crankshaft of the engine. The front cover 3 composes an operating oil chamber of the torque converter 1 together with the impeller 4. The turbine 5 is disposed within the operating oil chamber so as to be disposed axially in opposition to the impeller 4. The inner peripheral part of the turbine 5 is coupled to a turbine hub 11 to be described. The turbine hub 11 is coupled to a main driveshaft (not shown in the drawing) of the transmission.

The turbine hub 11 is a cylindrical member. The turbine hub 11 is composed of a boss 60 and a disc-shaped flange 61 formed on the outer peripheral surface of the boss 60. The boss 60 has a spline 62 formed on the inner peripheral surface thereof. The spline 62 is spline-coupled to the transmission side main driveshaft. Moreover, an outer peripheral surface 63 is formed on the boss 60. The outer peripheral surface 63 is located on the axially engine side of the flange 61.

[Construction of Lock-Up Device]

Using FIGS. 1 and 2, the lock-up device 6 will be herein explained. The lock-up device 6 is a device for mechanically transmitting a torque from the front cover 3 to the turbine 5, and simultaneously, for absorbing and attenuating a torsional vibration inputted therein. Put differently, the lock-up device 6 has a clutch function and a damper function. As shown in FIG. 1, the lock-up device 6 is disposed in a space between the front cover 3 and the turbine 5. The lock-up device 6 is mainly composed of a piston 8, a drive plate 9, a driven plate 10 and a plurality of torsion springs 12. These members entirely compose a damper mechanism 13. In the damper mechanism 13, the drive plate 9 functions as an input rotary member, the driven plate 10 functions as an output rotary member, and the torsion springs 12 function as elastic members between the both members. It should be noted that the piston 8 and the drive plate 9 may be regarded as functioning as the input rotary member.

An input rotary member is composed of the piston 8 and the drive plate 9. The piston 8 is disposed so as to axially divide the space between the front cover 3 and the turbine 5. The piston 8 is an annular disc-shaped member, and is also a member axially movable by variation in hydraulic pressure within the torque converter 1. The piston 8 is disposed on the axially transmission side of and adjacently to the front cover 3. The piston 8 has an annular friction coupling part 15.

The friction coupling part 15 is formed in the outer peripheral part of the piston 8. The friction coupling part 15 has an annular flat shape. The friction coupling part 15 is opposed to an annular flat friction surface 3a of the front cover 3. Additionally, an annular friction facing 16 is mounted to the front cover 3 side surface of the friction coupling part 15. The turbine 5 side surface of the friction coupling part 15 is processed by thermal treatment such as gas soft nitriding.

An outer peripheral side tubular part 17 is formed in the outer peripheral part of the piston 8 and axially extends toward the transmission. On the other hand, an inner peripheral side tubular part 18 is formed on the inner peripheral edge of the piston 8 and axially extends toward the transmission. The inner peripheral side tubular part 18 is radially supported by the outer peripheral surface 63 of the boss 60. Accordingly, the piston 8 is configured to be axially and rotation-directionally movable with respect to the turbine hub 11.

The drive plate 9 is fixed to the piston 8 so as to hold the torsion springs 12, and functions as an input member for inputting a torque into the torsion springs 12. The drive plate 9 is an annular plate member and is disposed on the axially transmission side (the turbine 5 side) of the outer peripheral part of the piston 8. The entire surface of the drive plate 9 is processed by carbo-nitriding. The drive plate 9 is composed of an inner peripheral side annular part 25, an outer peripheral side spring support part 26, first spring contact parts 40 and second spring contact parts 41. The annular part 25 is fixed to the outer peripheral part of the piston 8 by a plurality of rivets 28 aligned in a circumferential direction.

The spring support part 26 extends from the annular part 25 to the outer peripheral side, and is disposed on the axially transmission side of the friction coupling part 15 of the piston 8. Put differently, the spring support part 26 is supported by the turbine 5 side surface of the friction coupling part 15 of the piston 8, and is also supported by the inner peripheral surface of the outer peripheral side tubular part 17. Moreover, as shown in FIG. 2, the spring support part 26 has window parts 32. The torsion springs 12 are respectively disposed in the window parts 32. The transmission-side regions of the spring support part 26 are obliquely bent and are formed as bent regions.

The first spring contact parts 40 are parts to be contacted to one ends of the respective torsion springs 12. The first spring contact parts 40 are formed at equal intervals in the circumferential direction and protrude to the inner peripheral side. When described in detail, the first spring contact parts 40 are formed by drawing so as to protrude to the inner peripheral side.

The second spring contact parts 41 are parts to be contacted to the other ends of the respective torsion springs 12. The second spring contact parts 41 have a shape axially protruding toward the transmission. When described in detail, the second spring contact parts 41 are formed by drawing so as to protrude and axially curve toward the transmission.

Thus, the torsion springs 12 are held by the drive plate 9. Additionally, the piston 8, the drive plate 9 and the torsion springs 12 compose a piston mechanism as a sub assay.

The torsion springs 12 are disposed in the window parts 32 (see FIG. 2) of the drive plate 9. Each torsion spring 12 is composed of, for instance, a large coil spring 20, a small coil spring 21, spring sheets 29 and so forth.

The torsion springs 12 are held by the spring support part 26 and the outer peripheral part of the annular part 25. Additionally, the axially engine side part of each torsion spring 12 is supported by the friction coupling part 15 of the piston 8, whereas the axially transmission side part thereof is supported by the transmission-side bent region of the spring support part 26. Moreover, as shown in FIG. 2, the torsion springs 12 are rotation-directionally supported at the both rotation-directional ends thereof by the first spring contact parts 40 and the second spring contact parts 41.

The driven plate 10 is a member to which a torque from the torsion springs 12 is outputted. The driven plate 10 is an annular disc-shaped member. The driven plate 10 is disposed axially between the turbine 5 and the piston 8. The inner peripheral part of the driven plate 10 is fixed to the flange 61 by a plurality of rivets 47 aligned in the circumferential direction. The driven plate 10 has a plurality of spring support pawls 51 on the outer peripheral edge thereof. The spring support pawls 51 are contacted to the both ends of the respective torsion springs 12. Additionally, the driven plate 10 has cutout holes (not shown in the drawing) formed for disposing therein the torsion springs 12.

<Detailed Construction of Torsion Springs>

As shown in FIG. 2, each torsion spring 12 includes the large coil spring 20, the small coil spring 21 and the spring sheets 29.

The large coil springs 20 are disposed between the drive plate 9 and the driven plate 10, and function as elastic members. The large coil springs 20 are disposed in radially outer positions. When described in detail, the plural large coil springs 20 are disposed in radially outer positions so as to be aligned in the circumferential direction. Additionally, the plural large coil springs 20, which are eight large coil springs 20 for instance, are circumferentially disposed at equal intervals. Any two of the large coil springs 20, disposed radially in opposition to each other, have an equal free length. The large coil springs 20 are configured to be rotation-directionally compressed by relative rotation between the drive plate 9 and the driven plate 10.

The small coil springs 21 are disposed between the drive plate 9 and the driven plate 10, and function as elastic members. The respective small coil springs 21 are movably disposed in the inner peripheral parts of the plural (e.g., eight) large coil springs 20. Each small coil spring 21 is set to have a free length shorter than that of each large coil spring 20.

When described in detail, the small coil springs 21 are movably disposed between the first and second spring contact parts 40 and 41 of the drive plate 9 and the spring support pawls 51 of the driven plate 10. The small coil springs 21 are movable in the inner peripheral parts of the large coil springs 20 until being compressed between the first and second spring contact parts 40 and 41 of the drive plate 9 and the spring support pawls 51 of the driven plate 10. By contrast, the small coil springs 21 are immovable in the inner peripheral parts of the large coil springs 20 when being compressed between the first and second spring contact parts 40 and 41 of the drive plate 9 and the spring support pawls 51 of the driven plate 10.

Specifically, the plural (e.g., eight) small coil springs 21 are composed of first small coil springs 22 and second small coil springs 23. The first small coil springs 22 and the second small coil springs 23 are respectively disposed in the inner peripheral parts of the large coil springs 20 so as to be circumferentially adjacent to each other at intervals. Each first small coil spring 22 has a free length longer than that of each second small coil spring 23. Put differently, any two of the small coil springs 21, disposed adjacently to each other in the circumferential direction, have different free lengths.

More specifically, the eight small coil springs 21 are circumferentially disposed in the sequential order of the first small coil spring 22, the second small coil spring 23, the first small coil spring 22, the second small coil spring 23, the first small coil spring 22, the second small coil spring 23, the first small coil spring 22 and the second small coil spring 23. In the positional arrangement, any two of the small coil springs 21, disposed radially in opposition to each other, have an equal free length. For example, two first small coil springs 22, disposed radially in opposition to each other, have an equal free length. On the other hand, two second small coil springs 23, disposed radially in opposition to each other, have an equal free length.

Additionally, the stiffness of each large coil spring 20 and that of each small coil spring 21 are set such that a stiffness ratio K(n+1)/K(n) of an (N+1)-th stage torsional stiffness K(n+1) to an N-th stage torsional stiffness K(n) can be greater than or equal to 1.5 and less than or equal to 4.0 in torsional characteristics representing a relation between torsion angle and torque. Multistage torsional characteristics are herein formed by compressing at least either the large coil springs 20 or the small coil springs 21 in accordance with the torsion angle. It should be noted that N is a natural number.

The spring sheets 29 are disposed on the both ends of the respective large coil springs 20. Specifically, the spring sheets 29 are disposed between the ends of the large coil springs 20 and the drive plate 9 (the first and second spring contact parts 40 and 41). Additionally, the spring sheets 29 are disposed between the ends of the large coil springs 20 and the driven plate 10 (the spring support pawls 51).

[Action of Torque Converter]

An action of the torque converter 1 will be herein explained. When operating oil is supplied between the inner peripheral parts of the front cover 3 and the piston 8 by a hydraulic actuation mechanism (not shown in the drawings), the operating oil flows through the space between the front cover 3 and the piston 8 to the outer peripheral side. The operating oil flows to the further outer peripheral side via the gap between the front cover 3 and the friction facing 16, and flows into the body of the torque converter 1. Under the condition, the piston mechanism has been entirely moved to the axially transmission side, and clutch engagement at the friction coupling part 15 has been released.

Subsequently, when the operating oil is discharged from the space between the front cover 3 and the piston 8 by the hydraulic actuation mechanism (not shown in the drawings), the piston mechanism is entirely moved to the axially engine side. Accordingly, the friction facing 16 is strongly pressed onto the front cover 3, and clutch engagement is produced. A torque from the front cover 3 is transmitted to the damper mechanism 13 through the piston 8. In the damper mechanism 13, the torque is transmitted from the drive plate 9 to the driven plate 10 through the torsion springs 12. Then, the torque is outputted from the driven plate 10 to the shaft (not shown in the drawings) through the turbine hub 11.

When variation in torque is inputted from the engine side in the clutch engagement state, the torsion springs 12 are rotation-directionally compressed between the drive plate 9 and the driven plate 10 in the damper mechanism 13. Specifically, the torsion springs 12 are rotation-directionally compressed between the first and second spring contact parts 40 and 41 of the drive plate 9 and the spring support pawls 51 of the driven plate 10. At this time, the torsion springs 12 slide against the drive plate 9 and the piston 8 while being moved to the outer peripheral side by the centrifugal force.

[Action of Lock-Up Device]

Figure 3:
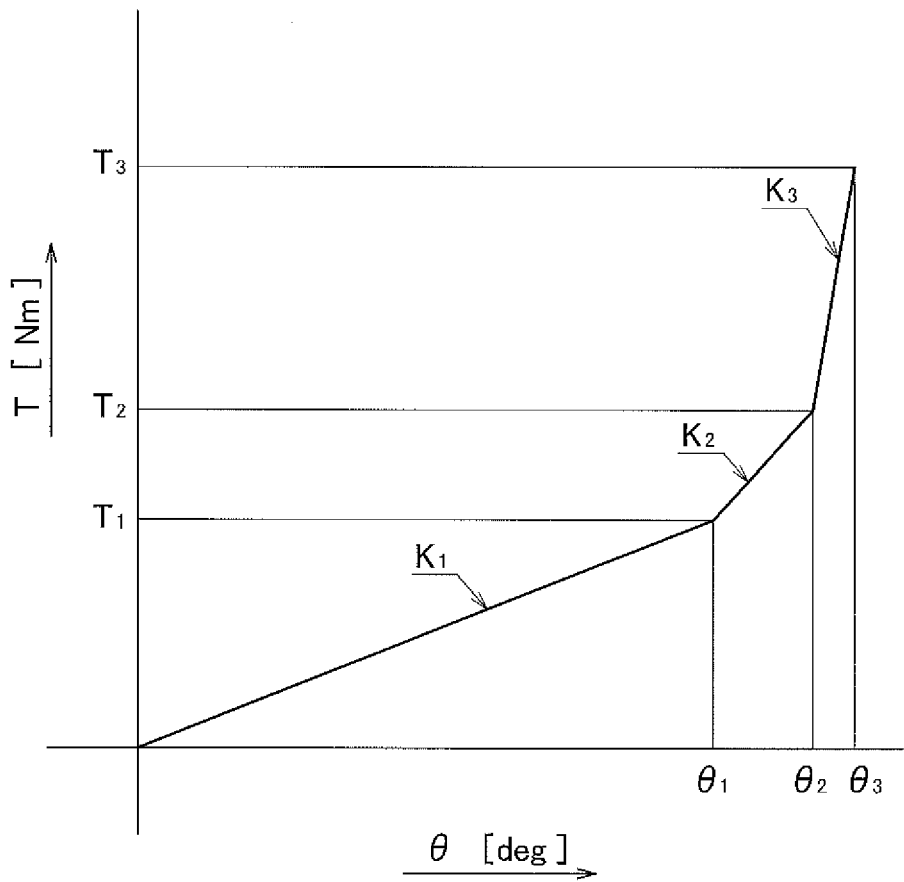
FIG. 3 is a diagram showing torsional characteristics of the lock-up device.

An action of the lock-up device 6 will be herein explained. When the drive plate 9 and the driven plate 10 start being rotated relatively to each other (when the drive plate 9 is rotated in the R1 direction), the eight large coil springs 20 are firstly compressed between the drive plate 9 (the first and second spring contact parts 40 and 41) and the driven plate 10 (the spring support pawls 51). Accordingly, as shown in FIG. 3, a first stage torsional stiffness K1 is formed. Next, when the torsion angle becomes a predetermined first angle θ1 or greater, the eight large coil springs 20 and the four first small coil springs 22 are compressed. Accordingly, a second stage torsional stiffness K2 is formed. Subsequently, when the torsion angle becomes a predetermined second angle θ2 or greater, the eight large coil springs 20, the four first small coil springs 22 and the four second small coil springs 23 are compressed. Accordingly, a third stage torsional stiffness K3 is formed. It should be noted that torsional characteristics similar to the above are formed also when the drive plate 9 is rotated oppositely to the R1 direction.

Thus, in the present lock-up device 6, three-stage torsional characteristics are set by compressing the respective coil springs in the sequential order of the large coil springs 20, the first small coil springs 22 and then the second small coil springs 23. Additionally, in the torsional characteristics, a stiffness ratio K2/K1 of the second stage torsional stiffness K2 to the first stage torsional stiffness K1 is set to be greater than or equal to 1.5 and less than or equal to 4.0.

It should be noted that an exemplary case is herein described that a stiffness ratio K3/K2 of the third stage torsional stiffness K3 to the second stage torsional stiffness K2 is set to be greater than 4.0. However, the stiffness ratio K3/K2 may be set to be greater than or equal to 1.5 and less than or equal to 4.0.

It should be noted that the first stage torsional stiffness K1 is defined by the absolute value of a first torque T1 to that of the first angle θ1. The second stage torsional stiffness K2 is defined by the absolute value of a differential between a second torque T2 and the first torque T1 to that of a differential between the second angle θ2 and the first angle θ1. The third stage torsional stiffness K3 is defined by the absolute value of a differential between a third torque T3 and the second torque T2 to that of a differential between a third angle θ3 and the second angle θ2.

[Features]

(A1) In the present lock-up device 6, when the drive plate 9 and the driven plate 10 are rotated relatively to each other, and for instance, a torsion angle is produced between the drive plate 9 and the driven plate 10, the plural large coil springs 20 are configured to be compressed. With the configuration, the first stage torsional stiffness K1 is formed in the torsional characteristics. Next, when the torsion angle becomes the predetermined first angle θ1 or greater, the plural large coil springs 20 and any one of the types of the plural small coil springs 21 are configured to be compressed. Accordingly, the second stage torsional stiffness K2 is formed in the torsional characteristics. Subsequently, when the torsion angle becomes the predetermined second angle θ2 or greater, the plural large coil springs 20 and (all of) the plural small coil springs 21 are configured to be compressed. Accordingly, the third stage torsional stiffness K3 is formed in the torsional characteristics. Thus, multistage torsional characteristics can be set in the present lock-up device 6.

Additionally, in the present lock-up device 6, the plural large coil springs 20 are disposed in the radially outer positions so as to be aligned in the circumferential direction, and the plural small coil springs 21 are respectively disposed in the inner peripheral parts of the large coil springs 20 so as to be movable therein. Put differently, in the present lock-up device 6, the plural large coil springs 20 and the plural small coil springs 21 are disposed on the outer peripheral part having axially small thickness in the torque converter. Hence, even when the lock-up device 6 is installed in the torque converter, the entire device construction can be produced with a smaller size than that of a conventional art.

(A2) In the present lock-up device 6, the constructions of any coil springs radially opposed to each other (the constructions of the large coil springs 20 and the constructions of the small coil springs 21) are the same. Hence, imbalance in center of gravity can be prevented in the lock-up device 6. Accordingly, a torque can be stably transmitted to the main driveshaft of the transmission.

(A3) In the present lock-up device 6, multistage torsional characteristics can be set by setting any two of the small coil springs 21 disposed circumferentially adjacent to each other to have different free lengths. Specifically, in this case, multistage torsional characteristics can be set by sequentially compressing the small coil springs 21 in accordance with increase in torsion angle θ such that the small coil springs 21 of the type having a long free length are compressed first. Thus, in the present lock-up device 6, multistage torsional characteristics can be set without addition of coil springs. Put differently, the lock-up device 6 can be set to have multistage torsional characteristics, and under the condition, compactness in size of the entire device construction can be achieved.

(A4) In the present lock-up device 6, when the torsion angle becomes the predetermined first angle θ1 or greater, the plural large coil springs 20 and the small coil springs 21 of the type having a long free length (either the first small coil springs 22 or the second small coil springs 23) are configured to be compressed. Accordingly, the second stage torsional stiffness K2 is formed in the torsional characteristics. Next, when the torsion angle becomes the predetermined second angle θ2 or greater, the plural large coil springs 20 and (all of) the plural small coil springs 21 (both the first small coil springs 22 and the second small coil springs 23) are configured to be compressed. Accordingly, the third stage torsional stiffness K3 is formed in the torsional characteristics.

Thus, in the present lock-up device 6, multistage torsional characteristics can be set without addition of a space required for coil springs. Put differently, the lock-up device 6 can be set to have multistage torsional characteristics, and under the condition, compactness in size of the entire device construction can be achieved.

(A5) In the present lock-up device 6, the stiffness ratio K2/K1 is set to be greater than or equal to 1.5 and less than or equal to 4.0. Hence, it is possible to inhibit a vibration that could be generated when a point on the curve of torsional characteristics exceeds any bent point, i.e., a vibration due to difference in magnitude of stiffness between stages. Thus, in the present lock-up device 6, it is possible to reliably inhibit a vibration attributed to coil springs.

Second Exemplary Embodiment

Figure 4:
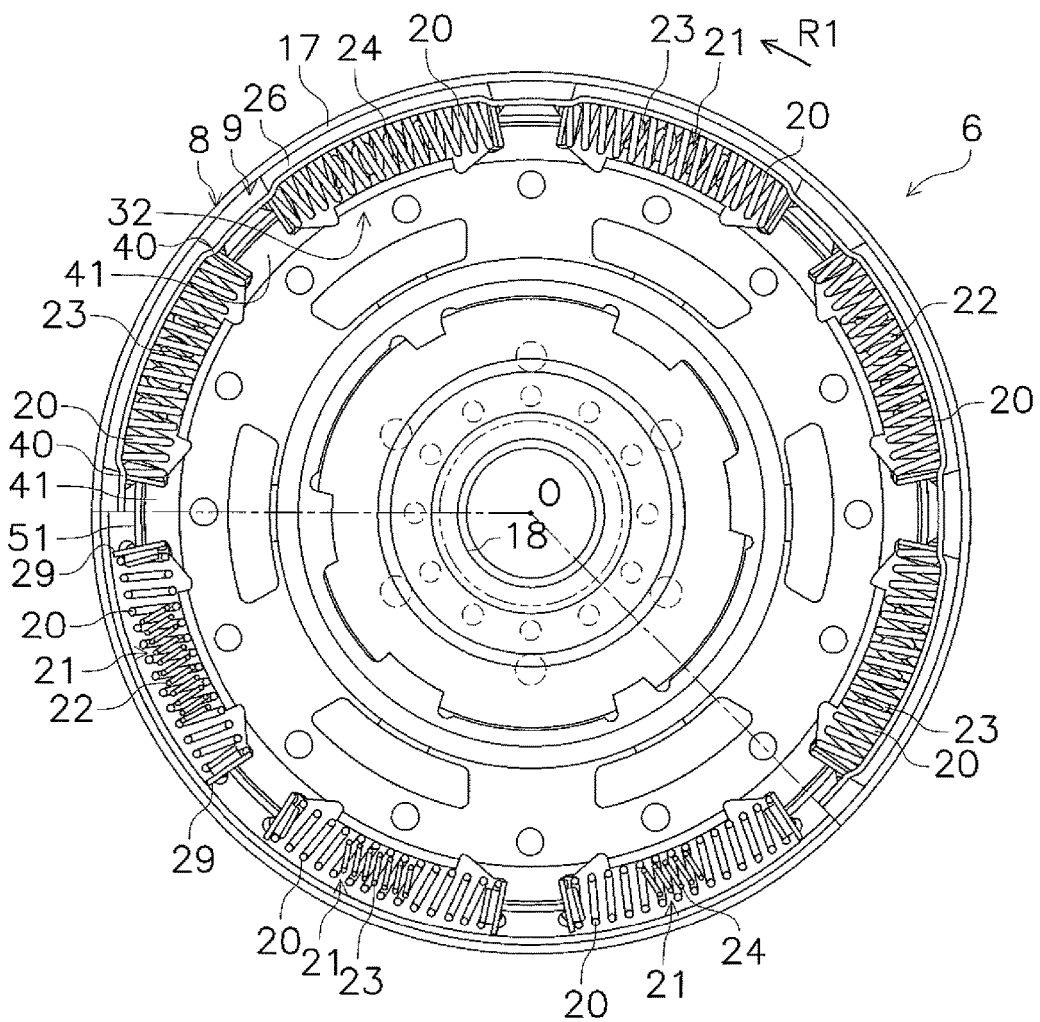
FIG. 4 is a lateral face view of a lock-up device employing a second exemplary embodiment of the present invention.

FIG. 4 shows a lock-up device according to a second exemplary embodiment. Except for the constructions of the small coil springs 21, the constructions of components of the lock-up device in the second exemplary embodiment are similar to those of their corresponding components of the lock-up device in the first exemplary embodiment. Therefore, components similar to their corresponding components in the first exemplary embodiment will not be herein explained. Additionally, in FIG. 4, reference signs, assigned to components of the first exemplary embodiment, are similarly assigned to their corresponding components. It should be noted that the construction of the torque converter body of the second exemplary embodiment is also similar to that of the torque converter body in the first exemplary embodiment. Hence, the torque converter body will not be also explained herein.

Components different from their corresponding components in the first exemplary embodiment will be hereinafter explained. In short, explanation of components not herein explained conforms to that of their corresponding components in the first exemplary embodiment.

[Construction of Lock-Up Device]

As shown in FIG. 4, the torsion springs 12 are disposed in the window parts 32 of the drive plate 9. The torsion springs 12 are composed of, for instance, the large coil spring 20, the small coil spring 21, the spring sheets 29 and so forth.

The large coil springs 20 are disposed between the drive plate 9 and the driven plate 10, and function as elastic members. The large coil springs 20 are disposed in radially outer positions. When described in detail, the plural large coil springs 20 are disposed in radially outer positions so as to be aligned in the circumferential direction. Additionally, the plural large coil springs 20, which are eight large coil springs 20 for instance, are circumferentially disposed at equal intervals. Any two of the large coil springs 20, disposed radially in opposition to each other, have an equal free length. The large coil springs 20 are configured to be rotation-directionally compressed by relative rotation between the drive plate 9 and the driven plate 10.

The small coil springs 21 are disposed between the drive plate 9 and the driven plate 10, and function as elastic members. The respective small coil springs 21 are movably disposed in the inner peripheral parts of the plural (e.g., eight) large coil springs 20. Each small coil spring 21 is set to have a free length shorter than that of each large coil spring 20.

When described in detail, the small coil springs 21 are movably disposed between the first and second spring contact parts 40 and 41 of the drive plate 9 and the spring support pawls 51 of the driven plate 10. The small coil springs 21 are movable in the inner peripheral parts of the large coil springs 20 until being compressed between the first and second spring contact parts 40 and 41 of the drive plate 9 and the spring support pawls 51 of the driven plate 10. By contrast, the small coil springs 21 are immovable in the inner peripheral parts of the large coil springs 20 when being compressed between the first and second spring contact parts 40 and 41 of the drive plate 9 and the spring support pawls 51 of the driven plate 10.

Specifically, the plural (e.g., eight) small coil springs 21 are composed of the first small coil spring 22, the second small coil spring 23 and third small coil springs 24. The first small coil springs 22, the second small coil springs 23 and the third small coil springs 24 are respectively disposed in the inner peripheral parts of the large coil springs 20 so as to be circumferentially away from each other at intervals. Put differently, the first to third small coil springs 22, 23 and 24 are separately disposed in the inner peripheral parts of the large coil springs 20 so as to be circumferentially aligned in the sequential order of the first small coil spring 22, the second small coil spring 23 and the third small coil spring 24.

Each first small coil spring 22 has a free length longer than that of each second small coil spring 23 and that of each third small coil spring 24. Each second small coil spring 23 has a free length longer than that of each third small coil spring 24. Thus, any two of the small coil springs 21, disposed circumferentially adjacent to each other, have different free lengths.

More specifically, the eight small coil springs 21 are circumferentially disposed in the sequential order of the first small coil spring 22, the second small coil spring 23, the third small coil spring 24, the second small coil spring 23, the first small coil spring 22, the second small coil spring 23, the third small coil spring 24 and the second small coil spring 23. In the positional arrangement, any two of the small coil springs 21, disposed radially in opposition to each other, have an equal free length. For example, two first small coil springs 22, disposed radially in opposition to each other, have an equal free length. Likewise, two second small coil springs 23, disposed radially in opposition to each other, have an equal free length. Moreover, two third small coil springs 24, disposed radially in opposition to each other, have an equal free length.

Additionally, the stiffness of each large coil spring 20 and that of each small coil spring 21 are set such that the stiffness ratio K(n+1)/K(n) of the (N+1)-th stage torsional stiffness K(n+1) to the N-th stage torsional stiffness K(n) can be greater than or equal to 1.5 and less than or equal to 4.0 in torsional characteristics representing the relation between torsion angle and torque. Multistage torsional characteristics are herein formed by compressing at least either the large coil springs 20 or the small coil springs 21 in accordance with the torsion angle. It should be noted that N is a natural number.

The spring sheets 29 are disposed on the both ends of the respective large coil springs 20. Specifically, the spring sheets 29 are disposed between the ends of the large coil springs 20 and the drive plate 9 (the first and second spring contact parts 40 and 41). Additionally, the spring sheets 29 are disposed between the ends of the large coil springs 20 and the driven plate 10 (the spring support pawls 51).

[Action of Lock-Up Device]

Figure 5:
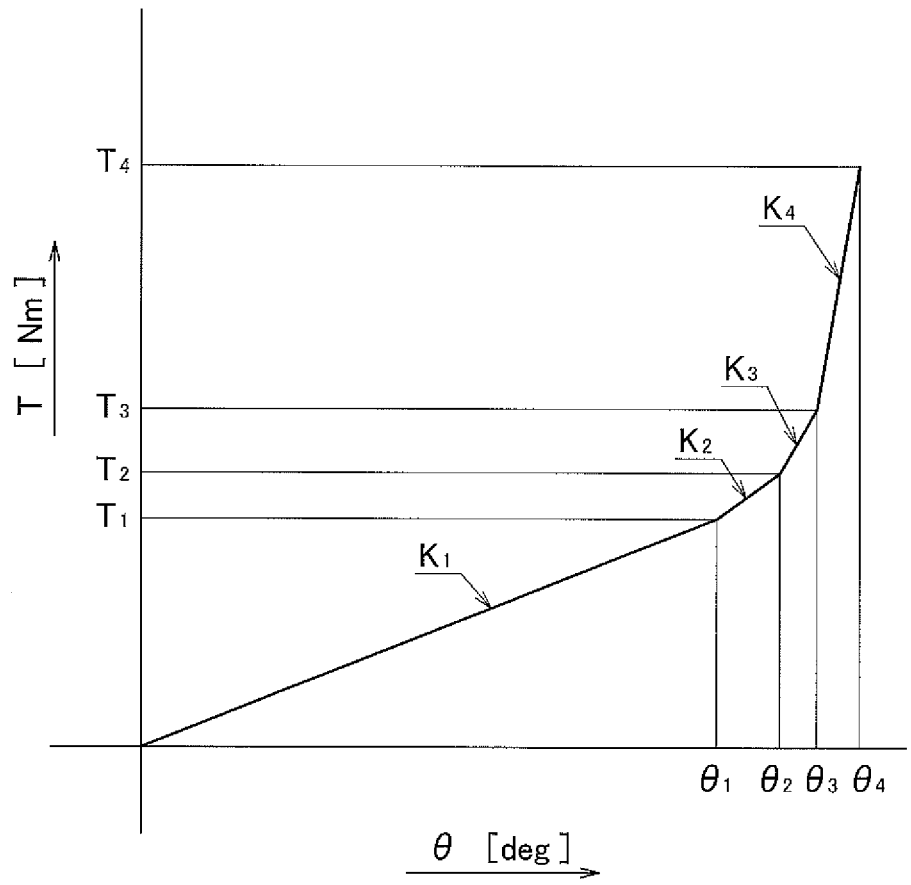
FIG. 5 is a diagram showing torsional characteristics of the lock-up device.

An action of the lock-up device 6 will be herein explained. When the drive plate 9 and the driven plate 10 start being rotated relatively to each other (when the drive plate 9 is rotated in the R1 direction), the eight large coil springs 20 are firstly compressed between the drive plate 9 (the first and second spring contact parts 40 and 41) and the driven plate 10 (the spring support pawls 51). Accordingly, as shown in FIG. 5, a first stage torsional stiffness K1 is formed. Next, when the torsion angle becomes a predetermined first angle θ1 or greater, the eight large coil springs 20 and the two first small coil springs 22 are compressed. Accordingly, a second stage torsional stiffness K2 is formed. Subsequently, when the torsion angle becomes a predetermined second angle θ2 or greater, the eight large coil springs 20, the two first small coil springs 22 and the four second small coil springs 23 are compressed. Accordingly, a third stage torsional stiffness K3 is formed. Afterwards, when the torsion angle becomes a predetermined third angle θ3 or greater, the eight large coil springs 20, the two first small coil springs 22, the four second small coil springs 23 and the two third small coil springs 24 are compressed. Accordingly, a fourth stage torsional stiffness K4 is formed. It should be noted that torsion characteristics similar to the above are formed also when the drive plate 9 is rotated oppositely to the R1 direction.

Thus, in the present lock-up device 6, four-stage torsional characteristics are set by compressing the respective coil springs in the sequential order of the large coil springs 20, the first small coil springs 22, the second small coil springs 23, and then the third small coil springs 24. Additionally, in the torsional characteristics, a stiffness ratio K2/K1 of the second stage torsional stiffness K2 to the first stage torsional stiffness K1 is set to be greater than or equal to 1.5 and less than or equal to 4.0. Moreover, a stiffness ratio K3/K2 of the third stage torsional stiffness K3 to the second stage torsional stiffness K2 is also set to be greater than or equal to 1.5 and less than or equal to 4.0.

It should be noted that an exemplary case is herein described that a stiffness ratio K4/K3 of the fourth stage torsional stiffness K4 to the third stage torsional stiffness K3 is set to be greater than 4.0. However, the stiffness ratio K4/K3 may be set to be greater than or equal to 1.5 and less than or equal to 4.0.

It should be noted that the first stage torsional stiffness K1 is defined by the absolute value of a first torque T1 to that of the first angle θ1. The second stage torsional stiffness K2 is defined by the absolute value of a differential between a second torque T2 and the first torque T1 to that of a differential between the second angle θ2 and the first angle θ1. The third stage torsional stiffness K3 is defined by the absolute value of a differential between a third torque T3 and the second torque T2 to that of a differential between the third angle θ3 and the second angle θ2. The fourth stage torsional stiffness K4 is defined by the absolute value of a differential between a fourth torque T4 and the third torque T3 to that of a differential between a fourth angle θ4 and the third angle θ3.

[Features]

(B1) In the present lock-up device 6, when the torsion angle becomes the predetermined first angle θ1 or greater, the plural large coil springs 20 and the small coil springs 21 of the type having the longest free length (the first small coil springs 22) are configured to be compressed. Accordingly, the second stage torsional stiffness K2 is formed in the torsional characteristics. Next, when the torsion angle becomes the predetermined second angle θ2 or greater, the plural large coil springs 20, the first small coil springs 22, and the small coil springs 21 of the type having the second longest free length (the second small coil springs 23) are configured to be compressed. Accordingly, the third stage torsional stiffness K3 is formed in the torsional characteristics. Subsequently, when the torsion angle becomes the predetermined third angle θ3 or greater, the plural large coil springs 20 and (all of) the plural small coil springs 21 (the first to third small coil springs 22, 23 and 24) are configured to be compressed. Accordingly, the fourth stage torsional stiffness K4 is formed in the torsional characteristics.

As described above, in the present lock-up device 6, multistage torsional characteristics can be set without addition of coil springs. Put differently, the lock-up device 6 can be set to have multistage torsional characteristics, and under the condition, compactness in size of the entire device construction can be achieved.

(B2) In the present lock-up device 6, the stiffness ratio K2/K1 and the stiffness ratio K3/K2 are both set to be greater than or equal to 1.5 and less than or equal to 4.0. Hence, it is possible to inhibit a vibration that could be generated when a point on the curve of torsional characteristics exceeds any bent point, i.e., a vibration due to difference in magnitude of stiffness between stages. Thus, in the present lock-up device 6, it is possible to reliably inhibit a vibration attributed to coil springs.

Third Exemplary Embodiment

Figure 6:
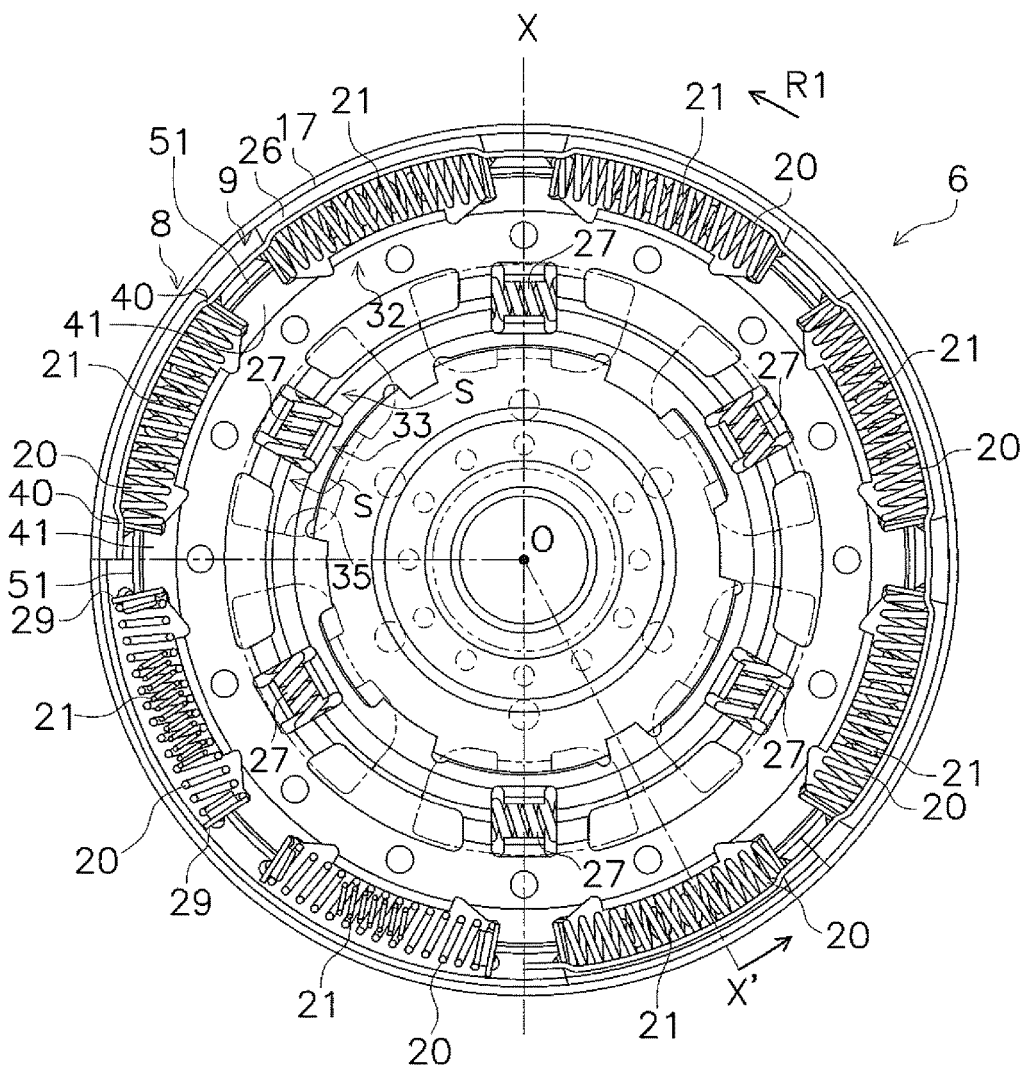
FIG. 6 is a lateral face view of a lock-up device employing a third exemplary embodiment of the present invention.
Figure 7:
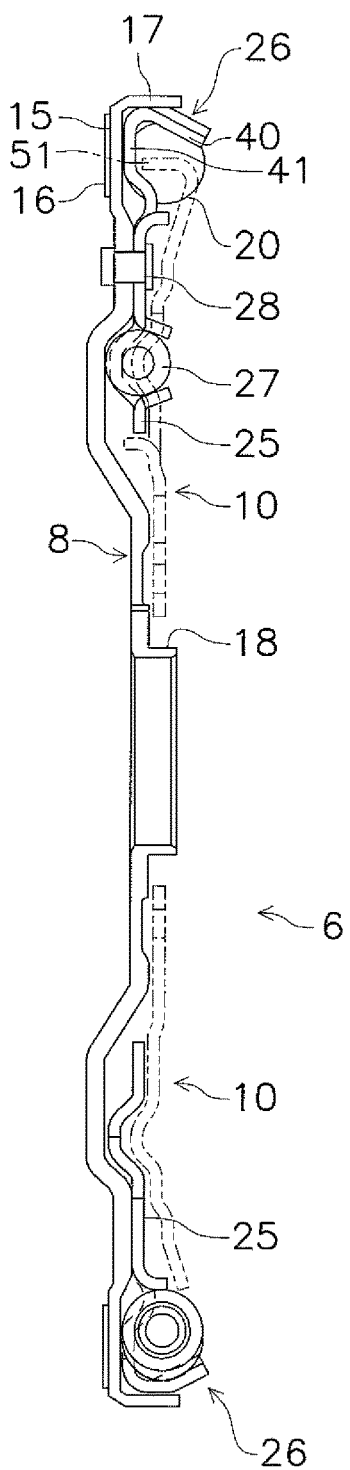
FIG. 7 is a cross-sectional view of the lock-up device.

FIGS. 6 and 7 show a lock-up device according to a third exemplary embodiment. Except for the constructions of the drive plate 9, the driven plate 10, the small coil springs 21 and parallel coil springs 27, the constructions of components of the lock-up device in the third exemplary embodiment are similar to those of their corresponding components of the lock-up device in the first exemplary embodiment. Therefore, components similar to their corresponding components in the first exemplary embodiment will not be herein explained. Additionally, in FIGS. 6 and 7, reference signs, assigned to components in the first exemplary embodiment, are similarly assigned to their corresponding components. It should be noted that the construction of the torque converter body in the third exemplary embodiment is also similar to that of the torque converter body in the first exemplary embodiment. Hence, the torque converter body will not be also explained herein.

Components different from their corresponding components in the first exemplary embodiment will be hereinafter explained. In short, explanation of components not herein explained conforms to that of their corresponding components in the first exemplary embodiment.

[Construction of Lock-Up Device]

As shown in FIGS. 6 and 7, the drive plate 9 is fixed to the piston 8 so as to hold the torsion springs 12, and functions as an input member for inputting a torque into the torsion springs 12. The drive plate 9 is an annular plate member and is disposed on the axially transmission side (the turbine 5 side) of the outer peripheral part of the piston 8. The entire surface of the drive plate 9 is processed by carbo-nitriding. The drive plate 9 is composed of the inner peripheral side annular part 25, the outer peripheral side spring support part 26, the first spring contact parts 40 and the second spring contact parts 41. The annular part 25 is fixed to the outer peripheral part of the piston 8 by the plural rivets 28 aligned in the circumferential direction.

The spring support part 26 extends from the annular part 25 to the outer peripheral side, and is disposed on the axially transmission side of the friction coupling part 15 of the piston 8. Put differently, the spring support part 26 is supported by the turbine 5 side surface of the friction coupling part 15 of the piston 8, and is also supported by the inner peripheral surface of the outer peripheral side tubular part 17. Moreover, as shown in FIG. 6, the spring support part 26 has first window parts 32 and second window parts 33. The large coil springs 20 are respectively disposed in the first window parts 32. The parallel coil springs 27 to be described are respectively disposed in the second window parts 33.

The driven plate 10 is a member to which a torque from the torsion springs 12 is outputted. The driven plate 10 is an annular disc-shaped member. The driven plate 10 is disposed axially between the turbine 5 and the piston 8. The inner peripheral part of the driven plate 10 is fixed to the flange 61. The driven plate 10 has the plural spring support pawls 51 on the outer peripheral edge thereof. The spring support pawls 51 are contacted to the both ends of the respective large coil springs 20. Additionally, the driven plate 10 has cutout holes (not shown in the drawing) formed for disposing therein the large coil springs 20. The driven plate 10 has cutout holes 35 for disposing therein the parallel coil springs 27.

As shown in FIGS. 6 and 7, the torsion springs 12 are composed of, for instance, the large coil springs 20, the small coil springs 21, the parallel coil springs 27, the spring sheets 29 and so forth.

The large coil springs 20 are disposed between the drive plate 9 and the driven plate 10, and function as elastic members. The large coil springs 20 are disposed in radially outer positions. When described in detail, the plural large coil springs 20 are disposed in radially outer positions so as to be aligned in the circumferential direction. Additionally, the plural large coil springs 20, which are eight large coil springs 20 for instance, are circumferentially disposed at equal intervals. Any two of the large coil springs 20, disposed radially in opposition to each other, have an equal free length. The large coil springs 20 are configured to be rotation-directionally compressed by relative rotation between the drive plate 9 and the driven plate 10.

The small coil springs 21 are disposed between the drive plate 9 and the driven plate 10, and function as elastic members. The respective small coil springs 21 are movably disposed in the inner peripheral parts of the plural (e.g., eight) large coil springs 20. Each small coil spring 21 is set to have a free length shorter than that of each large coil spring 20. Additionally, the eight small coil springs 21 respectively have an equal free length.

When described in detail, the small coil springs 21 are movably disposed between the first and second spring contact parts 40 and 41 of the drive plate 9 and the spring support pawls 51 of the driven plate 10. The small coil springs 21 are movable in the inner peripheral parts of the large coil springs 20 until being compressed between the first and second spring contact parts 40 and 41 of the drive plate 9 and the spring support pawls 51 of the driven plate 10. By contrast, the small coil springs 21 are immovable in the inner peripheral parts of the large coil springs 20 when being compressed between the first and second spring contact parts 40 and 41 of the drive plate 9 and the spring support pawls 51 of the driven plate 10.

The parallel coil springs 27 are disposed between the drive plate 9 and the driven plate 10, and function as elastic members. The plural (e.g., six) parallel coil springs 27 are disposed radially inward of the plural (e.g., eight) large coil springs 20 so as to be circumferentially aligned at intervals. Any two of the parallel coil springs 27, disposed radially in opposition to each other, have an equal length.

The parallel coil springs 27 are respectively disposed in the second window parts 33 of the drive plate 9. The both ends of the respective parallel coil springs 27 are held by the second window parts 33. Additionally, the parallel coil springs 27 are respectively disposed in the cutout holes 35 of the driven plate 10. Predetermined spaces S (gaps) are produced between the ends of each parallel coil spring 27 and the circumferential wall surfaces of each cutout hole 35. In other words, each parallel coil spring 27 is set to have a free length shorter than the circumferential length of each cutout hole 35.

The parallel coil springs 27 are configured to be actuated in parallel to the large coil springs 20. For detailed explanation of this, one ends of the parallel coil springs 27 are configured to be contacted to the driven plate 10 when the torsion angle becomes a predetermined angle by relative rotation between the drive plate 9 and the driven plate 10. Accordingly, the large coil springs 20 and the parallel coil springs 27 are configured to be compressed in parallel to each other.

Additionally, the stiffness of each large coil spring 20, that of each small coil spring 21, and that of each parallel coil spring 27 are set such that a stiffness ratio $K(n+1)/K(n)$ of an $(N+1)$-th stage torsional stiffness $K(n+1)$ to an N-th stage torsional stiffness $K(n)$ can be greater than or equal to 1.5 and less than or equal to 4.0 in at least one bent point of torsional characteristics representing a relation between torsion angle and torque. Multistage torsional characteristics are herein formed by compressing at least any type of the coil springs including the large coil springs 20, the small coil springs 21 and the parallel coil springs 27 in accordance with the torsion angle. It should be noted that N is a natural number.

The spring sheets 29 are disposed on the both ends of the respective large coil springs 20. Specifically, the spring sheets 29 are disposed between the ends of the large coil springs 20 and the drive plate 9 (the first and second spring contact parts 40 and 41). Additionally, the spring sheets 29 are disposed between the ends of the large coil springs 20 and the driven plate 10 (the spring support pawls 51).

It should be noted that an exemplary construction is herein described that the spring sheets 29 are not disposed on the both ends of the respective parallel coil springs 27, but the spring sheets 29 may be disposed on the both ends of the respective parallel coil springs 27.

[Action of Lock-Up Device]

An action of the lock-up device 6 will be herein explained. When the drive plate 9 and the driven plate 10 start being rotated relatively to each other (when the drive plate 9 is rotated in the R1 direction), the eight large coil springs 20 are firstly compressed between the drive plate 9 (the first and second spring contact parts 40 and 41) and the driven plate 10 (the spring support pawls 51). Accordingly, as shown in FIG. 3, the first stage torsional stiffness K1 is formed. Next, when the torsion angle becomes the predetermined first angle θ1 or greater, the eight large coil springs 20 and the eight first small coil springs 22 are compressed. Accordingly, the second stage torsional stiffness K2 is formed. Subsequently, when the torsion angle becomes the predetermined second angle θ2 or greater, the eight large coil springs 20, the eight small coil springs 21 and the six parallel coil springs 27 are compressed. Accordingly, the third stage torsional stiffness K3 is formed. It should be noted that torsion characteristics similar to the above are formed also when the drive plate 9 is rotated oppositely to the R1 direction.

Thus, in the present lock-up device 6, three-stage torsional characteristics are set by compressing the respective coil springs in the sequential order of the large coil springs 20, the small coil springs 21 and then the parallel coil springs 27. Additionally, in the torsional characteristics, the stiffness ratio K2/K1 of the second stage torsional stiffness K2 to the first stage torsional stiffness K1 is set to be greater than or equal to 1.5 and less than or equal to 4.0.

The stiffness ratio K3/K2 of the third stage torsional stiffness K3 to the second stage torsional stiffness K2 is herein set to be greater than 4.0. However, the stiffness ratio K3/K2 may be set to be greater than or equal to 1.5 and less than or equal to 4.0.

It should be noted that the first stage torsional stiffness K1 is defined by the absolute value of the first torque T1 to that of the first angle θ1. The second stage torsional stiffness K2 is defined by the absolute value of a differential between the second torque T2 and the first torque T1 to that of a differential between the second angle θ2 and the first angle θ1. The third stage torsional stiffness K3 is defined by the absolute value of a differential between the third torque T3 and the second torque T2 to that of a differential between the third angle θ3 and the second angle θ2.

[Features]

(C1) The present lock-up device 6 further includes the plural parallel coil springs 27 disposed on the inner peripheral side of the large coil springs 20. Hence, the number of stages of torsional characteristics can be further increased. By thus increasing the number of stages of torsional characteristics, the curve of torsional characteristics can be smoothly formed until the torque reaches the maximum value.

(C2) In the present lock-up device 6, the spaces S are produced between the parallel coil springs 27 and the driven plate 10. With the construction, the timing of actuating the parallel coil springs 27 is determined. Therefore, the timing of actuating the parallel coil springs 27 can be easily set by changing the size of the respective spaces S. Put differently, desired torsional characteristics can be easily set.

(C3) In the present lock-up device 6, the stiffness ratio of the (N+1)-th torsional stiffness to the N-th torsional stiffness is set to be greater than or equal to 1.5 and less than or equal to 4.0. Hence, it is possible to inhibit a vibration that could be generated when a point on the curve of torsional characteristics exceeds any bent point, i.e., a vibration due to difference in magnitude of stiffness between stages. Thus, in the present lock-up device 6, it is possible to reliably inhibit a vibration attributed to coil springs even when the number of stages of torsional characteristics is increased.

Other Exemplary Embodiments (a) In the first to third exemplary embodiments, it is assumed that the respective large coil springs 20 have an equal stiffness. However, the stiffness may be arbitrarily set. Additionally, it is assumed that the respective small coil springs 21 (the first to third small coil springs 22, 23 and 24) have an equal stiffness. However, the stiffness may be arbitrarily set. Moreover, it is assumed that the respective parallel coil springs 27 have an equal stiffness. However, the stiffness may be arbitrarily set. Even in the constructions herein described, it is possible to achieve advantageous effects similar to those achieved by the aforementioned first to third exemplary embodiments.

(b) In the aforementioned second exemplary embodiment, the exemplary construction has been explained that the free lengths of the respective small coil springs are arranged in the descending order of the free length of the first small coil springs 22, that of the second small coil springs 23 and that of the third small coil springs 24. However, the free lengths of the respective small coil springs may be set to be arranged in the descending order of the free length of the first small coil springs 22, that of the third small coil springs 24 and that of the second small coil springs 23. Even in the construction herein described, it is possible to achieve advantageous effects similar to those achieved by the aforementioned second exemplary embodiment.

(c) In the aforementioned third exemplary embodiment, the construction has been described that the respective spaces S (gaps) have an equal size. However, the parallel coil springs 27 to be disposed in the second window parts 33 may have different circumferential lengths, and/or, the cut-out holes 35 may have different circumferential sizes. With the construction, torsional characteristics having three or more stages can be formed.

(d) In the aforementioned third exemplary embodiment, the exemplary construction has been described that the plural small coil springs 21 have an equal length. However, at least one of the plural small coil springs 21 may be set to have a free length different from that of the remaining small coil springs 21. With the construction, torsional characteristics having three or more stages can be formed. For example, when the small coil springs 21 similar to those of the aforementioned first exemplary embodiment are used, the four-stage torsional characteristics shown in FIG. 5 can be formed. Alternatively, when the small coil springs 21 similar to those of the aforementioned second exemplary embodiment are used, for instance, five-stage torsional characteristics can be formed.

(e) In the present lock-up device 6, the exemplary construction has been described that the plural (six) parallel coil springs 27 have an equal free length. Alternatively to this, at least any one of the plural parallel coil springs 27 may be set to have a free length different from that of the remaining parallel coil springs 27. In the construction, the actuation timings of the respective parallel coil springs 27 depend on the free lengths of the respective parallel coil springs 27. Hence, torsional characteristics having more multiple stages can be set.

INDUSTRIAL APPLICABILITY

The present invention is widely applicable to lock-up devices.

REFERENCE SIGNS LIST

1 Torque converter
3 Front cover
6 Lock-up device
9 Drive plate (Input rotary member)
10 Driven plate (Output rotary member)
12 Torsion spring
20 Large coil spring
21 Small coil spring
22 First small coil spring
23 Second small coil spring
24 Third small coil spring
27 Parallel coil spring
S Space

The invention claimed is:

1. A lock-up device for a torque converter for transmitting a torque and for absorbing and attenuating a torsional vibration, the torque converter including a turbine, the lock-up device comprising:
an input rotary member fixed to the turbine;
an output rotary member disposed to be rotatable with respect to the input rotary member;
a plurality of large coil springs disposed in radially outer positions so as to be aligned in a circumferential direction, the large coil swings configured to be respectively compressed in a rotational direction by relative rotation between the input rotary member and the output rotary member, wherein each of the plurality of large coil springs is disposed between the input rotary member and the output rotary member; and
a plurality of small coil springs set to have a free length shorter than a free length of the large coil springs, wherein the free lengths of any two of the small coil springs disposed adjacently to each other in the rotational direction are different, the small coil springs separately disposed in inner peripheral parts of the large coil springs so as to be movable therein, and
the respective coil springs are configured to be compressed in a sequential order of the plural large coil springs and then at least any one of the plural small coil springs by the relative rotation between the input rotary member and the output rotary member.

2. The lock-up device for a torque converter recited in claim 1, wherein
the free lengths of any two of the large coil springs disposed radially in opposition to each other are equal, and
the free lengths of any two of the small coil springs disposed radially in opposition to each other are equal.

3. The lock-up device for a torque converter recited in claim 1, wherein
the plural small coil springs include a first small coil spring and a second small coil spring,
the first small coil spring and the second small coil spring are disposed in the inner peripheral parts of the large coil springs so as to be aligned adjacently to each other in the circumferential direction, and
the free length of the first small coil spring and the free length of the second small coil spring are different.

4. The lock-up device for a torque converter recited in claim 3, wherein
the plural small coil springs further include a third small coil spring,
the first to third small coil springs are separately disposed in the inner peripheral parts of the large coil springs so as to be aligned in the circumferential direction in a sequential order of the first small coil spring, the second small coil spring and the third small coil spring,
the free length of the first small coil spring is longer than the free length of either of second and third small coil springs, and
the free length of the either of the second and third small coil springs is longer than the free length of the other of the second and third small coil springs.

5. The lock-up device for a torque converter recited in claim 1, wherein a stiffness ratio of an (N+1)-th torsional stiffness to an N-th torsional stiffness is set to be greater than or equal to 1.5 and less than or equal to 4.0 (N is a natural number) in at least one bent point of multistage torsional characteristics representing a relation between the torque and a torsion angle corresponding to the relative rotation between the input rotary member and the output rotary member, the multistage torsional characteristics formed by compressing at least either the large coil springs or the small coil springs in accordance with the torsion angle.

6. The lock-up device for a torque converter recited in claim 1, further comprising:
a plurality of parallel coil springs disposed radially inward of the large coil springs so as to be aligned in the circumferential direction, the parallel coil springs configured to be separately actuated in parallel to the large coil springs, wherein
the respective coil springs are configured to be compressed in a sequential order of the plural large coil springs, at least any one of the plural small coil springs and at least one of the plural parallel coil springs by the relative rotation between the input rotary member and the output rotary member.

7. The lock-up device for a torque converter recited in claim 6, wherein
a space is produced circumferentially between each of the parallel coil springs and one of the input rotary member and the output rotary member, and
the at least one of the plural parallel coil springs is configured to be compressed when a torsion angle corresponding to the relative rotation between the input rotary member and the output rotary member becomes a predetermined angle.

8. The lock-up device for a torque converter recited in claim 6, wherein
a stiffness ratio of an (N+1)-th torsional stiffness to an N-th torsional stiffness is set to be greater than or equal to 1.5 and less than or equal to 4.0 (N is a natural number) in at least one bent point of multistage torsional characteristics representing a relation between the torque and a torsion angle corresponding to the relative rotation between the input rotary member and the output rotary member, the multistage torsional characteristics formed by compressing at least any one type of the coil springs including the large coil springs, the small coil springs, and the parallel coil springs in accordance with the torsion angle.

9. The lock-up device for a torque converter recited in claim 1, wherein the at least any one of the plural small coil springs is configured to be compressed in parallel with one of the large coil springs, which is disposed on an outer side of the at least any one of the small coil springs, in the rotational direction by relative rotation between the input rotary member and the output rotary member.

* * * * *